United States Patent
Ferdosi et al.

(10) Patent No.: US 7,623,630 B2
(45) Date of Patent: Nov. 24, 2009

(54) DOUBLE-ENDED LINE PROBING (DELP) FOR DSL SYSTEMS

(75) Inventors: Nima Ferdosi, San Jose, CA (US); Jalil Kamali, San Jose, CA (US)

(73) Assignee: Ikanos Communications, Inc., Fremont, CA (US)

( * ) Notice: Subject to any disclaimer, the term of this patent is extended or adjusted under 35 U.S.C. 154(b) by 843 days.

(21) Appl. No.: 11/101,945

(22) Filed: Apr. 8, 2005

(65) Prior Publication Data

US 2006/0227940 A1 Oct. 12, 2006

(51) Int. Cl.
H04M 1/24 (2006.01)
H04M 3/08 (2006.01)
H04M 3/22 (2006.01)

(52) U.S. Cl. .............. 379/27.01; 379/1.04; 379/22.07; 379/24; 379/29.05

(58) Field of Classification Search .............. 379/27.01, 379/1.01, 1.03, 1.04, 22, 22.04, 2.07, 23, 379/24, 29.01, 29.05, 32.04; 708/277
See application file for complete search history.

(56) References Cited

U.S. PATENT DOCUMENTS

| | | | | |
|---|---|---|---|---|
| 6,177,801 | B1 * | 1/2001 | Chong | 324/520 |
| 6,417,672 | B1 * | 7/2002 | Chong | 324/520 |
| 6,606,719 | B1 | 8/2003 | Ryckenbusch et al. | |
| 6,668,041 | B2 | 12/2003 | Kamali et al. | |
| 6,801,601 | B2 | 10/2004 | Kamali et al. | |
| 2003/0076878 | A1 * | 4/2003 | Jones et al. | 375/219 |
| 2003/0101206 | A1 * | 5/2003 | Graziano et al. | 708/277 |
| 2004/0267678 | A1 * | 12/2004 | Gao et al. | 706/2 |
| 2006/0098725 | A1 * | 5/2006 | Rhee et al. | 375/222 |

OTHER PUBLICATIONS

PCT International Search Report and Written Opinion, PCT/US2006/012544, Oct. 31, 2007, 9 pages.
ITU-T Recommendation G.992.3; Asymmetric digital subscriber line transceivers 2 (ADSL2), pp. 1-450.
Long, Guozhu and Kamali, Jalil; "Single-ended line probing helps speed up DSL mass deployment"; IIC-China/ESC-China 2002 Conference Proceedings, pp. 57-60.
ITU-T G.996.1; Test Procedures for Digital Subscriber Line (DSL) Transceivers; International Telecommunication Union; Feb. 2001, Geneva, Switzerland, pp. 1-78.
T1.413 Issue 2; Network and Customer Installation Interfaces—Asymmetric Digital Subscriber Line (ADSL) Metallic Interface; Committee T1-Telecommunications; Nov. 30-Dec. 4, 1998; Plano, TX, USA; pp. 1-248.

* cited by examiner

Primary Examiner—Binh K Tieu
(74) Attorney, Agent, or Firm—IP Creators; Charles C Cary

(57) ABSTRACT

Double-ended line probing (DELP) techniques are described herein that enable a loop configuration to be identified based on mathematically simple error functions, which are both time-efficient and less sensitive to measurement errors. A DELP algorithm uses readily available data about the channel that is generated prior to the modem operation (e.g., theoretical loop models) and other available data (e.g., that provided by loop diagnostic modules) to estimate the loop configuration including the line length and gauge, as well as the number of bridge taps and their gauges, lengths, and locations.

18 Claims, 2 Drawing Sheets

DOUBLE-ENDED LINE PROBING (DELP) FOR DSL SYSTEMS

FIELD OF THE INVENTION

The invention relates to Digital Subscriber Line (DSL) communications, and more particularly, to loop qualification in a DSL system.

BACKGROUND OF THE INVENTION

DSL communications use copper telephone lines (e.g., twisted pair) for high-speed data transmission. A major problem for DSL service providers is to accurately qualify a subscriber's local loop (sometimes referred to as "probing the line") prior to the deployment of DSL service. Using line probing techniques, operators can identify and locate any blocking elements that disqualify the loop for DSL deployment and determine whether DSL service can be provided on the loop.

If the loop is qualified, then line probing techniques can be used to determine the type of DSL service through identifying the line topology and noise characteristics. Line probing can also provide guidance as to how to improve the service by removing certain elements from the loop or disturbers from the bundle. This type of probing is provided prior to DSL deployment. After DSL deployment and in the case of a problem interrupting the modem connection, line probing techniques can be used for troubleshooting to identify and locate problems, as well as to provide continued service improvement.

In either case (pre or post DSL deployment), line probing saves the cost and time associated with sending a technician and equipment to the customer cite (sometimes referred to as a "truck roll"). There are generally two types of line probing: Single Ended Line Probing (SELP) and Double-Ended Line Probing (DELP).

SELP is the process of qualifying and/or identifying the loop from the Central Office (CO) end of the loop. The customer premises equipment (CPE) end of the loop may be open or telephone-terminated. Example, single ended line probing techniques are described in U.S. Pat. No. 6,668,041, titled "Single Ended Line Probing in DSL System" and U.S. Pat. No. 6,801,601, titled "Single Ended Line Probing in DSL System Using Transformerless Hybrid." Each of these patents is herein incorporated by reference in its entirety.

With DELP, on the other hand, both the CO and CPE are involved in the line probing process. One known DELP technique compares information collected at the CPE with a channel and remote terminal simulation model at the CO. By matching the collected data and the model-generated data and through an exhaustive search, it is possible to identify the exact loop configuration. However, such matching techniques employ algorithms with complex mathematical structure that have poor performance when fed with real data (corrupted by measurement error). Moreover, an exhaustive search of this type for matching modeled data to collected data is not time-efficient, and its long execution time makes it impractical.

What is needed, therefore, are double-ended line probing techniques that are time-efficient and less sensitive to measurement errors.

SUMMARY OF THE INVENTION

One embodiment of the present invention provides a method for carrying out double-ended line probing (DELP) on a copper telephone line having up to two bridge taps located thereon. The method includes estimating a gauge and length for each bridge tap using an error function in conjunction with theoretical data. The method further includes estimating a length and gauge for the line using measured data (main portion of the loop excluding the bridge taps), and estimating the location of each bridge tap using an error function and the estimated gauge and length for each bridge tap and the estimated length and gauge for the line. In response to determining that a difference between a measured overall insertion loss magnitude and an estimated overall insertion loss magnitude is greater than a pre-defined error threshold, the method may include iterating a number of times to improve parameter estimation results.

The method may further include calculating a second approximation of line length and gauge based on the estimated locations, gauges and lengths of the bridge taps, and the approximation of the length and gauge for the line. In one particular embodiment, the measured data includes an overall channel insertion loss magnitude. Here, the method further include deriving a channel insertion loss magnitude for the line without the bridge taps, by dividing the measured overall channel insertion loss magnitude by a product of channel insertion loss magnitudes associated with the estimated gauges and lengths of the bridge taps. The theoretical data associates channel insertion loss magnitude for the line and line length and gauge.

Another embodiment of the present invention provides a device for carrying out double-ended line probing (DELP) on a copper telephone line having up to two bridge taps located thereon. The device includes a processor programmed for estimating a gauge and length for each bridge tap using an error function in conjunction with theoretical data. A processor is also included for estimating a length and gauge for the line using measured data. A processor is also included for estimating the location of each bridge tap using an error function and the estimated gauge and length for each bridge tap and the estimated length and gauge for the line. Each of the processors can be implemented, for example, as a set of instructions programmed into an overall processing environment (e.g., microcontroller or digital signal processor) configured to execute the instructions.

In one particular embodiment, the processor for estimating a length and gauge for the line using measured data is further configured for calculating a second approximation of line length and gauge based on the estimated locations, gauges and lengths of the bridge taps, and the approximation of the length and gauge for the line. In response to determining that a difference between a measured overall insertion loss magnitude and an estimated overall insertion loss magnitude is greater than a pre-defined error threshold, at least one of the processors can further be configured to iterate on estimations a number of times to improve parameter estimation results.

The system may further include a loop diagnostic module for providing the measured data, and a theoretical loop model for providing the theoretical data. For instance, the loop diagnostic module could be the Loop Diagnostic Module (LDM) of the G.992.3 ADSL standard. The theoretical loop model could be, for instance, configured according to the G.996.1 standard.

In one particular embodiment, the measured data includes an overall channel insertion loss magnitude, and the processor for estimating a length and gauge for the line using measured data is further configured to derive a channel insertion loss magnitude for the line without the bridge taps, by dividing the measured overall channel insertion loss magnitude by a product of channel insertion loss magnitudes associated with the estimated gauges and lengths of the bridge taps. The theoretical loop model can be used to associate channel insertion loss magnitude for the line and line length and gauge. Note that this model can be included in the processors or overall processor, or can simply be made accessible to the processors.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Double-ended line probing (DELP) techniques are described herein that enable a loop configuration to be identified based on mathematically simple error functions, which are both time-efficient and less sensitive to measurement errors. The techniques can be employed using available standards, such as the latest ADSL standard (G.992.3) from the ITU-T. Other standards (e.g., ANSI's T1E1.413) that can benefit from embodiments of the present invention will be apparent in light of this disclosure.

The latest G.992.3 ADSL standard has a Loop Diagnostic Module (LDM), which generates useful information about the channel and its noise profile. The LDM measures or otherwise generates this information and makes it available for further processing or representation. Other standards provide similar channel and noise profile information. One of the useful pieces of information produced by the LDM is the magnitude of the overall channel insertion loss, which can be utilized in conjunction with a theoretical loop model (e.g., such as that described in G.996.1) to identify the loop configuration with good accuracy in accordance with an embodiment of the present invention.

Each of the ITU-T's G.992.3 and G.996.1 standards, as well as the ANSI T1E1.413 standard, are herein incorporated by reference in its entirety.

DSL System Overview

Figure 1:
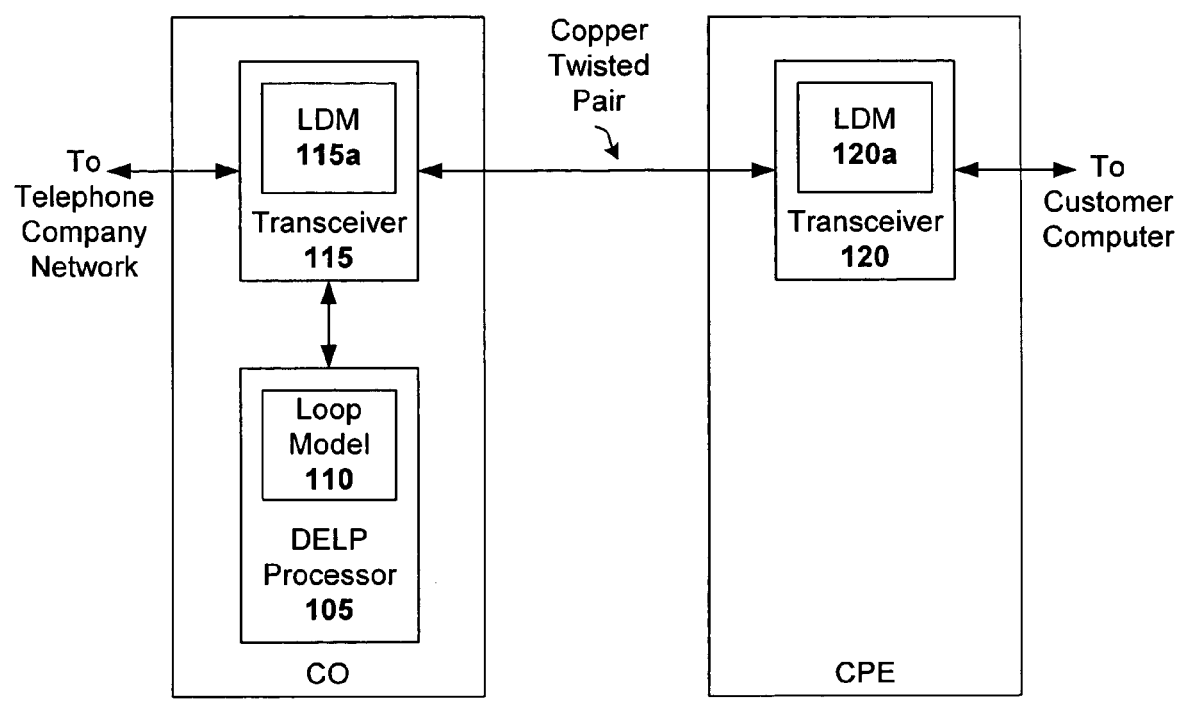
FIG. 1 is a block diagram of a DSL system configured for carrying out DELP in accordance with one embodiment of the present invention.

FIG. 1 is a block diagram of a DSL system configured for carrying out DELP in accordance with one embodiment of the present invention.

As can be seen, the system includes a Central Office (CO) and Customer Premise Equipment (CPE). The CO includes a transceiver 115 that is communicatively coupled to a transceiver 120 at the CPE via a copper telephone line (also called a twisted pair). The transceiver 115 of the CO is also communicatively coupled to the telephone company network or backbone (e.g., via an ATM interface), and the transceiver 120 at the CPE is coupled with a customer's computer or other such device.

Each of the transceivers 115 and 120 includes a Loop Diagnostic Module (LDM) 115a and 120a, respectively. Recall that such diagnostic modules are defined in the various telecommunication standards, such as the previously incorporated G.992.3. The transceivers 115 and 120, as well as their respective Loop Diagnostic Modules 115a and 120a, can be implemented with conventional or custom technology. As previously explained, the Loop Diagnostic Modules 115a and 120a measure various parameters of the channel and its noise profile. One parameter measured by an LDM is the magnitude of the overall channel insertion loss, which includes insertion loss of the line, as well as the insertion loss of each bridge tap on that line (if any).

The CO also includes a Double-Ended Line Probing (DELP) processor 105 that is configured to execute a DELP algorithm configured in accordance with an embodiment of the present invention. Details of the DELP algorithm are provided in turn, and with reference to FIG. 2. The DELP processor 105 can be implemented, for example, with a microcontroller configured with an I/O to interface with transceiver 115 and programmed with a number of parameter estimation routines used in the DELP algorithm. Other suitable processing environments can be used here as well, and the DELP processor can be implemented with any combination of hardware, software, and firmware, as will be apparent in light of this disclosure. Further note that the DELP processor can be implemented as a set of instructions stored on a processor readable medium, such as a server or a CD.

The DELP processor 105 also includes or otherwise has access to a theoretical loop model 110. The theoretical loop model is developed as is conventionally done, and is made available for use by the DSL system. This model includes information about a theoretical loop, such as insertion loss magnitude for a bridge tap having a known length and gauge, as well as insertion loss magnitude for a plain loop (no bridge taps) having a known length and gauge. Theoretical information for other line and bridge tap combinations is also available in the model. Using this model 110 in conjunction with the DELP algorithm, it is possible to estimate real loop parameters, such as line length and gauge, and bridge tap length, gauge and location.

For example, if the channel insertion loss magnitude of a plain loop (no bridge taps) is known, then the model 110 can be consulted to estimate the corresponding length and gauge of that plain loop. Also, if the overall channel insertion loss magnitude of a loop is known, then the model 110 can be used in conjunction with an error function to identify the channel insertion loss magnitudes of bridge taps on that line, as well as the gauge and length of those bridge taps. The model 110 provides other useful theoretical information as well, and may be consulted as needed to identify theoretical loop parameters for use in the estimation of real loop parameters. For instance, if the overall channel insertion loss of a single bridge tap line is known, along with the gauge and length of the single bridge tap on that line, then the model 110 can be used in conjunction with an error function to estimate the location of that bridge tap. Other useful associations represented in the theoretical loop model 110 will be apparent in light of this disclosure.

In one embodiment, the theoretical loop model 110 is developed in accordance with the ITU-T's G.996.1 standard, which discusses test procedures for DSL transceivers. Theoretical loop models of other DSL standards may also be employed here, so long as the theoretical loop data provided by the model can be exploited by the DELP algorithm to estimate actual loop parameters.

DELP Algorithm

In general, the DELP algorithm uses relatively simple error functions for optimization and makes maximum use of the linear properties of the loop. This significantly improves the algorithm and reduces its execution time.

For purposes of initial estimation, assume that up to two bridge taps exist at the ends of a given line. The actual length and gauge of the line, as well as the length, gauge, and location of the bridge taps, are to be estimated. If one bridge tap is found to be of zero length, it indicates the presence of one bridge tap on the line (i.e., single bridge tap line). Likewise, if two bridge taps are found to be of zero length, it indicates the presence of no bridge taps (i.e., plain line).

is the product of ABCD matrixes of two sections and the bridge tap. Assume the line has a length d and the bridge tap is located at distance x from one end, and a distance y from the other end, such that d=x+y.

Thus, the overall transmission matrix is equal to:

$$\begin{bmatrix} \cosh\gamma x & z_0\sinh\gamma x \\ z_0^{-1}\sinh\gamma x & \cosh\gamma x \end{bmatrix} \begin{bmatrix} 1 & 0 \\ z_t^{-1} & 1 \end{bmatrix} \begin{bmatrix} \cosh\gamma y & z_0\sinh\gamma y \\ z_0^{-1}\sinh\gamma y & \cosh\gamma y \end{bmatrix} = \begin{bmatrix} \cosh\gamma d + z_0 z_t^{-1}\sinh\gamma x\cosh\gamma y & z_0\sinh\gamma d + z_0^2 z_t^{-1}\sinh\gamma x\sinh\gamma y \\ z_0^{-1}\sinh\gamma d + z_t^{-1}\cosh\gamma x\cosh\gamma y & \cosh\gamma d + z_0 z_t^{-1}\sinh\gamma y\cosh\gamma x \end{bmatrix}$$ (Equation 5)

It is possible to approximate the magnitude of the channel insertion loss of a plain line (no bridge taps) by an exponential function of frequency and loop length. In more detail, consider a plain line loop with the following transmission matrix Φ:

$$\Phi = \begin{bmatrix} A & B \\ C & D \end{bmatrix},$$

where
$A=D=\cosh\gamma d$
$B=Z_0\sinh\gamma d$
$C=Z_0^{-1}\sinh\gamma d.$ (Equation 1)

Here, $Z_0$ and $\gamma$ are the characteristic impedance and propagation constant of the loop, respectively, and d is the loop length.

The channel insertion loss magnitude H(f) of this loop is given as follows:

$$H(f) = \frac{2Z_L}{CZ_L^2 + (A+D)Z_L + B},$$ (Equation 2)

where $Z_L$ is the load impedance. For the frequencies in the DSL band (e.g., >26 KHz), it is safely assumed that:

$Z_0 = Z_1 = Z,$ (Equation 3)

where $Z_G$ is the source impedance. Therefore, $$H(f) = \frac{2Z_L}{CZ_L^2 + (A+D)Z_L + B}$$ (Equation 4)

$$= \frac{2Z}{Z^2(Z^{-1}(\sinh\gamma d)) + Z(2\cosh\gamma d) + (Z\sinh\gamma d)}$$

$$= \frac{1}{(\sinh\gamma d + \cosh\gamma d)}$$

$$= e^{-\gamma d} \approx e^{-\omega d\sqrt{LC}}$$

Further consider a line with one bridge tap, where the transmission matrix $$\Phi = \begin{bmatrix} A & B \\ C & D \end{bmatrix}$$

where $z_t$ is the bridge tap impedance. And the channel insertion loss H(f) is equal to:

$$H(f) = \frac{2Z_L}{CZ_L^2 + (A+D)Z_L + B}.$$ (Equation 6)

Looking at Equations 5 and 6, note that swapping x and y does not change the channel insertion loss since B, C and (A+D) remain the same. So theoretically, every overall channel insertion loss magnitude of a line with one bridge tap can belong to two different line configurations. Likewise, every overall channel insertion loss magnitude of a line with two bridge taps can belong to four different line configurations. This understanding can be used to efficiently consult the theoretical loop model during the parameter estimation processes.

In view of the these Equations, the approximated magnitude of the channel insertion loss magnitude H(f) for a plain line (no bridge taps) can be determined using:

$|H(f)| \cong K_1 e^{-K_2 lf},$ (Equation 7)

where $K_1$ and $K_2$ depend on the loop type and gauge, l is the loop length, and f is the transmission frequency.

The measurement error associated with this approximation of Equation 7 is mainly due to the un-removed filters, which appear as a coefficient, multiplied by the channel insertion loss (or constants added to the channel insertion loss in dB). Thus, by differentiating the magnitude of the channel insertion loss H(f) (in dB), the effect of these errors can be removed:

$|H_{dB}(f)| \cong -Klf + c_1,$ (Equation 8)

$$\frac{d}{df}|H_{dB}(f)| \cong c_2,$$ (Equation 9)

$$\frac{d^2}{df^2}|H_{dB}(f)| \cong 0,$$ (Equation 10)

where $c_1$ and $c_2$ are constants.

Thus, note that for a plain line (no bridge taps), the second derivative of the channel insertion loss magnitude is zero. Another point to note here is that when a line has bridge taps, the overall channel insertion loss magnitude is approximately equal to the product of the insertion loss magnitudes of the bridge taps and the plain line.

In more detail, assume $H_1$ is the channel insertion loss magnitude of a line with a bridge tap located at an arbitrary location in the middle of the line. Recall that in the DSL band, it is safe to assume:

$$Z_0 = Z_t = Z_l = Z. \quad \text{(Equation 11)}$$

Therefore by using Equation 5, the overall channel insertion loss magnitude H(f) can be derived as follows:

$$H(f) = \frac{2Z_L}{CZ_L^2 + (A+D)Z_L + B} \quad \text{(Equation 12)}$$

$$= \frac{2Z}{Z^2(Z^{-1}(\text{Sinh}\gamma d + \text{Cosh}\gamma x \text{Cosh}\gamma y)) + Z(2\text{Cosh}\gamma d + \text{Sinh}\gamma d) + (Z\text{Sinh}\gamma d + Z\text{Sinh}\gamma y \text{Sinh}\gamma x)}$$

$$= \frac{2}{(\text{Sinh}\gamma d + \text{Cosh}\gamma x \text{Cosh}\gamma y) + (2\text{Cosh}\gamma d + \text{Sin}\gamma d) + (\text{Sin}\gamma d + \text{Sinh}\gamma y \text{Sinh}\gamma x)}$$

$$= \frac{2}{3(\text{Cosh}\gamma d + \text{Sinh}\gamma d)}.$$

Equation 12 shows that as long as Equation 11 is satisfied, channel insertion loss magnitude is independent of the location of the bridge taps (x and y). In other words, the overall channel insertion loss magnitude is approximately equal to the product of insertion loss magnitudes of the bridge taps and the plain line:

$$H(f) \approx H_{No\_Tap} \times H_{Tap1} \times H_{Tap2}, \quad \text{(Equation 13)}$$

where $H_{No\_Tap}$ represents the approximated insertion loss for the plain part of the line, $H_{Tap\,1}$ represents the approximated insertion loss for the bridge tap at one end of the line, and $H_{Tap\,2}$ represents the approximated insertion loss for the bridge tap at the other end of the line.

Using the approximations provided by Equations 10 and 13, it is possible to define an error function for identifying the gauge and length of the bridge taps (if any). Given a set of data $H_{Data}(f)$ in dB (which is the measured overall channel insertion loss magnitude provided by the Loop Diagnostic Modules 115a and 120a), the length and gauge of the bridge taps can be found by minimizing the following error function:

$$\text{error} = \int_{\text{Bin\_start}}^{\text{Bin\_end}} \left| \frac{d^2}{df^2} \left( \frac{H_{Data}(f)}{H_{Tap1}(f) \times H_{Tap2}(f)} \right) \right| df. \quad \text{(Equation 14)}$$

The bridge taps' length and gauge is the pair of tap length and gauge that minimizes error over all possible $H_{Tap1}(f)$ and $H_{Tap2}(f)$, where $H_{Tap1}(f)$ and $H_{Tap2}(f)$ are the channel insertion loss magnitudes of the bridge taps calculated based on a theoretical loop model 110. In particular, given the measured overall channel insertion loss magnitude $H_{Data}(f)$, the model 110 can be consulted to identify the possible corresponding line configurations. These configurations each include possible bridge tap channel insertion loss magnitudes. Thus, once the bridge tap channel insertion loss magnitudes that minimize the error function of Equation 14 are identified, then the theoretical loop model can be consulted to determine the corresponding length and gauge of those bridge taps.

Also, note that in this example, Bin_start is the start of the channel frequency range, and Bin_end is the end of the channel frequency range. Recall that in a discrete multitone (DMT) modulation scheme (as used in many DSL communication systems), the channel between two modems is divided into a number of bins (sometimes referred to as sub-channels or carriers) for both upstream and downstream communication. Note, however, that the present invention can be employed to the benefit of non DMT-based systems as well.

After identifying the bridge taps and finding their gauge and length, the first estimate of the loop length and gauge is calculated using Equation 13 as shown here:

$$H_{No\_tap} \approx H_{Data}(f)/(H_{Tap1}(f) \times H_{Tap2}(f)). \quad \text{(Equation 15)}$$

Note that the location of the bridge taps at this point is assumed to be at the ends of the line. $H_{No\_Tap}$ is the channel insertion loss magnitude for the plain part of the line, and is derived from the overall measured channel insertion loss magnitude $H_{Data}(f)$ and the estimated channel insertion loss magnitudes for the bridge taps ($H_{Tap1}(f)$ and $H_{Tap2}(f)$), as shown in Equation 15.

Now, using the approximation provided by Equation 8 and finding the slope of $H_{No\_Tap}$, the first approximation of the length and gauge of the line can be computed by referencing the theoretical loop model 110. In particular, the model 110 allows the line length and gauge corresponding to $H_{NO\_Tap}$ to be identified. Note that since Equations 8, 9, 10, and 13 provide approximations, the first approximation of the loop length is based on the average slope of $H_{No\_Tap}$.

In the next step, by using the already estimated data (line length and gauge, and bridge taps length and gauge), the location of the bridge taps can be estimated. According to the approximation provided by Equation 13, the measured channel insertion loss magnitude ($H_{Data}(f)$) can be divided by the channel insertion loss magnitude of one of the bridge taps ($H_{Tapj}(f)$) (which was previously estimated using Equation 14), thereby providing a result that is approximately the channel insertion loss magnitude of a line with only one bridge tap ($H_{One\_Tap}$).

$$H_{One\_Tap} = H_{Data}(f)/H_{Tapj}(f) \quad \text{(Equation 16)}$$

Estimating the location of this bridge tap can be done by minimizing the following error function:

$$\text{error} = \int |H_{One\_Tap}(f) - H_{Test}(f)| df, \quad \text{(Equation b 17)}$$

where $H_{Test}$ is the theoretical overall channel insertion loss magnitude of a single tap line with the same length and gauge, and the same single bridge tap length and gauge as $H_{One\_Tap}$, but with the bridge tap in a different location. Thus, the bridge tap location associated with the $H_{Test}$ that minimizes the error function of Equation 17 is the estimated location of the bridge tap. $H_{Test}$ is provided by (or otherwise derived from) the theoretical loop model 110. This bridge tap location process is done twice, once for each bridge tap (if the line has been identified to have two bridge taps). Note that given a channel insertion loss magnitude, there is always an ambiguity in the location of the bridge tap since the channel insertion loss magnitude can belong to a line with two different bridge tap locations with the same distance from the middle of the line.

After finding an approximation of the locations of the bridge taps, the second line length and gauge approximation can be performed using a new $H_{Test}$, which is the theoretical overall channel insertion loss magnitude of a line with the same bridge taps (length, gauge, and location) as found before (using Equations 14 and 17), but different line length and gauge. The following error function is minimized to determine the line length and gauge:

$$\text{error} = \int |H_{Data}(f) - H_{Test}(f)| df \quad \text{(Equation 18)}$$

Thus, the line length and gauge associated with the $H_{Test}$ that minimizes the error function of Equation 18 is the second line length and gauge approximation. $H_{Test}$ is provided by (or otherwise derived from) the theoretical loop model 110.

Note that Equation 18 can also be performed iteratively to achieve a higher accuracy at the expense of time. Specifically, as long as the Equation 18 is greater than a pre-defined error threshold and the number of iterations is less then a pre-specified number, we can iterate the algorithm to improve the accuracy. If not, the DELP process is concluded.

Note that the proposed method can be used to identify various types of loops (U.S., Japanese, European, etc.) as long as the mathematical model of these loops is available.

Methodology

Figure 2:
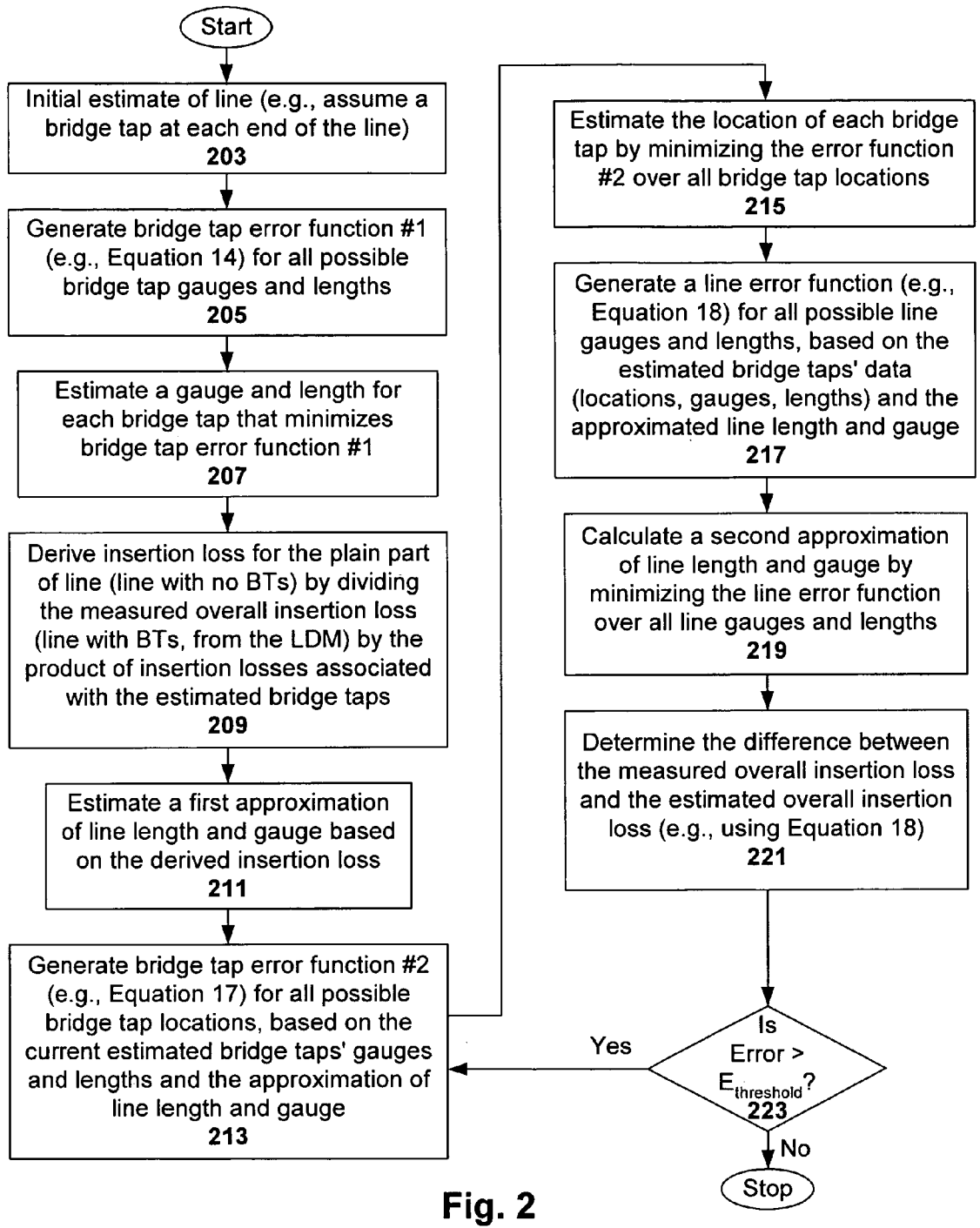
FIG. 2 illustrates a method for carrying out DELP in accordance with one embodiment of the present invention.

FIG. 2 illustrates a method for carrying out DELP in accordance with one embodiment of the present invention. The method can be carried out, for example, by the system shown in FIG. 1.

The method begins with initially estimating 203 the line. For purposes of discussion, assume that there is a bridge tap at each end of the line. The method continues with generating 205 a bridge tap error function #1 for all possible bridge tap gauges and lengths, and then estimating 207 a gauge and length for each bridge tap that minimizes the bridge tap error function #1. In one such embodiment, given the measured overall channel insertion loss magnitude $H_{Data}(f)$ (e.g., as provided by the Loop Diagnostic Modules 115a and 120a), a theoretical loop model 110 is consulted to identify possible bridge tap channel insertion loss magnitudes that minimize the error function of Equation 14. Thus, once the bridge tap channel insertion loss magnitudes that minimize the error function of Equation 14 are identified, then the theoretical loop model can be consulted to determine the corresponding length and gauge of those bridge taps.

The method continues with deriving 209 the channel insertion loss magnitude for the plain part of line (line with no bridge taps) by dividing the measured overall channel insertion loss magnitude (line with BTs, from the LDM) by the product of channel insertion loss magnitudes associated with the estimated bridge taps. The method continues with estimating 211 a first approximation of line length and gauge based on the derived channel insertion loss magnitude for the plain part of line. In one embodiment, Equation 14 is used to derive the channel insertion loss magnitude for the plain part of line ($H_{No\_Tap}$), and the theoretical loop model 110 is consulted to identify the line length and gauge corresponding to $H_{No\_Tap}$.

The method continues with generating 213 a bridge tap error function #2 for all possible bridge tap locations, based on the current estimated bridge taps' gauges and lengths and the approximation of line length and gauge. The method then proceeds with estimating 215 the location of each bridge tap by minimizing the error function #2 over all bridge tap locations. In one such embodiment, Equation 17 is used as the error function #2, where $H_{Test}$ is the theoretical overall channel insertion loss magnitude of a single tap line with the same length and gauge, and the same single bridge tap length and gauge as $H_{One\_Tap}$, but with the bridge tap in a different location. Thus, the bridge tap location associated with the $H_{Test}$ that minimizes the error function of Equation 17 is the estimated location of the bridge tap. $H_{Test}$ is provided by (or otherwise derived from) the theoretical loop model 110. This bridge tap location process can be done twice, once for each bridge tap (if the line has been identified to have two bridge taps).

The method continues with generating 217 a line error function for all possible line gauges and lengths (based on the estimated bridge taps' locations, gauges, lengths, and the approximated line length and gauge), and then calculating 219 a second approximation of line length and gauge by minimizing the line error function over all line gauges and lengths. In one such embodiment, Equation 18 is used as the line error function, where, the line length and gauge associated with the $H_{Test}$ that minimizes the error function of Equation 18 is the second line length and gauge approximation. Again, $H_{Test}$ is provided by (or otherwise derived from) the theoretical loop model.

The method continues with determining 221 a difference (error) between the measured overall insertion loss magnitude and the estimated overall insertion loss magnitude. In one such embodiment, the error function of Equation 18 is used. In any case, the method proceeds with determining 223 whether the determined error is greater than a pre-defined error threshold. If so, the DELP process is concluded. Otherwise, iterate by repeating steps 213 through 223 to improve the parameter estimation results. Note that a maximum number of iterations (e.g., three) can be specified here to prevent excessive iteration.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for double-ended line probing (DELP) on a copper telephone line having up to two bridge taps located thereon, comprising:

measuring an overall channel insertion loss magnitude on the copper telephone line;

generating a bridge tap error function #1 which includes the measured channel insertion loss magnitude measured in the measuring act and estimated insertion loss magnitudes of the bridge taps for all possible bridge tap gauges and lengths;

estimating a gauge and length for each bridge tap that minimizes the bridge tap error function #1 generated in the generating act;

deriving the insertion loss for the line with no bridge taps by dividing the overall channel insertion loss measured in the measuring act by a product of insertion loss magnitudes associated with the estimated bridge tap length and gauge estimated in the estimating act; and estimating a first approximation of a length and gauge for the line based on the insertion loss of the line with no bridge taps derived in the deriving act;

thereby transforming the measured overall channel insertion, loss magnitude into physical and topological parameters of the copper telephone line, including both the estimated length and gauge of the telephone line together with estimated bridge tap length and gauge thereof.

2. The method of claim 1, further comprising:

generating a line error function for all possible line gauges and lengths, based on the estimated locations, gauges and lengths of the bridge taps, and the approximation of the length and gauge for the line; and calculating a second approximation of line length and gauge by minimizing the line error function over all line gauges and lengths.

3. The method of claim 2, wherein the line error function is $$\text{error} = \int |H_{Data}(f) - H_{Test}(f)| df$$

where $H_{Data}$ (f) is a measured overall channel insertion loss magnitude, and $H_{Test}$ is a theoretical overall channel insertion loss magnitude of a line with bridge taps having their length, gauge and location equal to the estimated bridge taps' length, gauge and location, and once the line length and gauge that minimizes the line error function is identified, the second approximation of line length and gauge is also identified.

4. The method of claim 2, wherein in response to determining that a difference between a measured overall insertion loss magnitude and an estimated overall insertion loss magnitude is greater than a pre-defined error threshold, the method includes iterating a number of times to improve parameter estimation results.

5. The method of claim 1, further comprising:
generating a bridge tap error function #2 for all possible bridge taps locations, based on the estimated gauges and lengths of the bridge taps and the approximation of the length and gauge for the line; and
estimating the location of each bridge taps by minimizing the bridge taps error function #2 over all bridge tap locations.

6. The method of claim 1, further comprising:
deriving a channel insertion loss magnitude for the line without the bridge taps, by dividing a measured overall channel insertion loss magnitude by a product of channel insertion loss magnitudes associated with the estimated gauges and lengths of the bridge taps; wherein the estimating a first approximation of a length and gauge for the line is based on the derived channel insertion loss magnitude and a theoretical loop model that associates channel insertion loss magnitude for the line and line length and gauge.

7. The method of claim 1, wherein the bridge tap error function #1 is $$\text{error} = \int_{\text{Bin\_start}}^{\text{Bin\_end}} \left| \frac{d^2}{df^2}\left(\frac{H_{Data}(f)}{H_{Tap1}(f) \times H_{Tap2}(f)}\right) \right| df,$$

where Bin_start is a start of channel frequency range, and Bin_end is an end of channel frequency range, $H_{Data}$ (f) is a measured overall channel insertion loss magnitude, and $H_{Tap\,1}$ (f) and $H_{Tap\,2}$ (f) are channel insertion loss magnitudes of the bridge taps from a theoretical loop model and, once the bridge tap channel insertion loss magnitudes that minimize the error function #1 are identified within the model, the estimated length and gauge of those bridge taps are also identified within the model.

8. The method of claim 5, wherein the bridge tap error function #2 is $$\text{error} = \int |H_{One\_Tap}(f) - H_{Test}(f)| df$$

where $H_{One\_Tap}$ is an approximation of channel insertion loss magnitude of a line with only one bridge tap, and $H_{Test}$ is a theoretical overall channel insertion loss magnitude of a single tap line with line length and gauge equal to the first approximation of length and gauge for the line, and bridge tap length and gauge equal to those associated with $H_{One\_Tap}$, and once the bridge tap location that minimizes the error function #2 is identified, the estimated bridge tap location is also identified.

9. The method of claim 8, wherein $$H_{One\_Tap} = H_{Data}(f) / H_{Tapj}(f)$$

where $H_{Data}$ (f) is a measured overall channel insertion loss magnitude, and $H_{Tapj}$ (f) is a channel insertion loss magnitude for one of the bridge taps estimated using error equation #1.

10. A means for double-ended line probing (DELP) on a copper telephone line having up to two bridge taps located thereon, comprising:
means for measuring an overall channel insertion loss magnitude on the copper telephone line;
means for generating a bridge tap error function #1 which includes the measured channel insertion loss magnitude measured by the means for measuring and estimated insertion loss magnitudes of the bridge taps for all possible bridge tap gauges and lengths;
means for estimating a gauge and length for each bridge tap that minimizes the bridge tap error function #1 generated by the means for generating;
means for deriving the insertion loss for the line with no bridge taps by dividing the overall channel insertion loss measured by the means for measuring by a product of insertion loss magnitudes associated with the estimated bridge tap length and gauge estimated by the means for estimating; and
means for estimating a first approximation of a length and gauge for the line based on the insertion loss of the line with no bridge taps derived by the means for deriving; thereby transforming the measured overall channel insertion loss magnitude into physical and topological parameters of the copper telephone line, including both the estimated length and gauge of the telephone line together with estimated bridge tap length and gauge thereof.

11. The means of claim 10, further comprising:
means for deriving a channel insertion loss magnitude for the line without the bridge taps, by dividing a measured overall channel insertion loss magnitude by a product of channel insertion loss magnitudes associated with the estimated gauges and lengths of the bridge taps; wherein the estimating a first approximation of a length and gauge for the line is based on the derived channel insertion loss magnitude and a theoretical loop model that associates channel insertion loss magnitude for the line and line length and gauge.

12. The method of claim 10, wherein the bridge tap error function #1 is $$\text{error} = \int_{\text{Bin\_start}}^{\text{Bin\_end}} \left| \frac{d^2}{df^2}\left(\frac{H_{Data}(f)}{H_{Tap1}(f) \times H_{Tap2}(f)}\right) \right| df,$$

where Bin_start is a start of channel frequency range, and Bin_end is an end of channel frequency range, $H_{Data}$ (f) is a measured overall channel insertion loss magnitude, and $H_{Tap\,1}$(f) and $H_{Tap\,2}$(f) are channel insertion loss magnitudes of the bridge taps from a theoretical loop model and, once the bridge tap channel insertion loss magnitudes that minimize the error function #1 are identified within the model, the estimated length and gauge of those bridge taps are also identified within the model.

13. The means of claim 10, further comprising:
generating a bridge tap error function #2 for all possible bridge tap locations, based on the estimated gauges and lengths of the bridge taps and the approximation of the length and gauge for the line; and
estimating the location of each bridge tap by minimizing the bridge tap error function #2 over all bridge tap locations.

14. The means of claim 13, wherein the bridge tap error function #2 is $$\text{error} = \int |H_{One\_Tap}(f) - H_{Test}(f)| df$$

where $H_{One\_tap}$ is an approximation of channel insertion loss magnitude of a line with only one bridge tap, and $H_{Test}$ is a theoretical overall channel insertion loss magnitude of a single tap line with line length and gauge equal to the first approximation of length and gauge for the line, and bridge tap length and gauge equal to those associated with $H_{One\_tap}$, and once the bridge tap location that minimizes the error function #2 is identified, the estimated bridge tap location is also identified.

15. The means of claim 14, wherein $$H_{One\_Tap} = H_{Data}(f)/H_{Tapj}(f)$$

where $H_{Data}(f)$ is a measured overall channel insertion loss magnitude, and $H_{Tapj}(f)$ is a channel insertion loss magnitude for one of the bridge taps estimated using error equation #1.

16. The method of claim 13, further comprising:
generating a line error function for all possible line gauges and lengths, based on the estimated locations, gauges and lengths of the bridge taps, and the approximation of the length and gauge for the line; and
calculating a second approximation of line length and gauge by minimizing the line error function over all line gauges and lengths.

17. The means of claim 16, wherein the line error function is $$\text{error} = \int |H_{Data}(f) - H_{Test}(f)| df$$

where $H_{Data}(f)$ is a measured overall channel insertion loss magnitude, and $H_{Test}$ is a theoretical overall channel insertion loss magnitude of a line with bridge taps having their length, gauge and location equal to the estimated bridge taps' length, gauge and location, and once the line length and gauge that minimizes the line error function is identified, the second approximation of line length and gauge is also identified.

18. The means of claim 16, wherein in response to determining that a difference between a measured overall insertion loss magnitude and an estimated overall insertion loss magnitude is greater than a pre-defined error threshold, the method includes iterating a number of times to improve parameter estimation results.

\* \* \* \* \*